United States Patent [19]

Stoutenburg

[11] 4,277,081
[45] Jul. 7, 1981

[54] BUMPER TRAILER HITCH

[76] Inventor: Garnet H. Stoutenburg, 1411 - 19 Ave., NW., Calgary, Alberta, Canada

[21] Appl. No.: 62,427

[22] Filed: Jul. 31, 1979

[51] Int. Cl.³ .............................................. B60D 1/00
[52] U.S. Cl. ................................................... 280/502
[58] Field of Search ............... 248/361, 503, 225.3 R, 248/227, 228; 254/79; 24/265 R, 265 EC, 69 R, 69 ST, 71 R, 71 T, 71 ST; 280/502

[56] References Cited

U.S. PATENT DOCUMENTS

| 2,432,249 | 12/1947 | Pearson | 280/502 |
| 3,434,740 | 3/1969 | Leavitt | 280/502 |
| 4,027,894 | 6/1977 | Hawkins | 280/502 |
| 4,196,919 | 4/1980 | Tomen | 280/502 |

FOREIGN PATENT DOCUMENTS 1062305  11/1979  Canada ..................................... 280/502

*Primary Examiner*—John P. Silverstrim
*Assistant Examiner*—Randall A. Schrecengost
*Attorney, Agent, or Firm*—Burns, Doane, Swecker & Mathis

[57] ABSTRACT

A trailer hitch for mounting on the front or rear bumper of a vehicle is disclosed. The hitch is useful for hauling trailers of various types and is particularly useful in launching boats from boat trailers while secured by the hitch to the front end of the vehicle. The trailer hitch comprises, a main hitch member having a bumper catch thereon, a pivot member pivotally connected to the main hitch member, a second bumper catch connected to the pivot member, adjustable legs connected to the main hitch member for supporting the hitch on the bumper, and a handle for drawing the second bumper catch against the edge of the bumper.

6 Claims, 3 Drawing Figures

BUMPER TRAILER HITCH

This invention is a detachable vehicle front or rear bumper trailer hitch which can be used for hauling trailers of various types and for launching a boat mounted on a trailer into a body of water by using the front end of the vehicle.

BACKGROUND OF THE INVENTION

There is a need for a lightweight readily detachable trailer hitch that can be secured to the front or rear bumper of an automobile or light truck for hauling trailers of various types.

A particular problem relates to hauling pleasure boats by trailer. Many people who own pleasure boats today haul the pleasure boats to various attractive water sites by means of trailers which are hitched to the rear of an automobile or a light truck. When the driver reaches the body of water upon which he wishes to launch his boat, he backs the trailer with the boat mounted thereon into the water until the boat can be either floated or slid off the trailer into the water.

There are a number of difficulties associated with launching a pleasure boat into a body of water in this manner. First, particularly in locations where the shore advances into the water at a shallow grade, the trailer must be backed into the water a considerable distance, which oftens means that the rear drive wheels of the automobile or light truck are also backed into the water. Many times, when the driver wishes to move the automobile or light truck forward, he finds that the rear wheels are mired in water logged sand, or there is no traction because algae and other underwater organisms have left a slippery film on the underwater areas of the shore line. The driver then must go to considerable trouble to get his vehicle free of the water. Sometimes, the driver has to go so far as to call a tow truck to pull his vehicle free. This is a considerable nuisance and frequently very expensive, particularly in wilderness recreational areas that are located a considerable distance from service stations that operate tow trucks.

Another difficulty associated with backing the trailer and the boat into a body of water is that by having the trailer hitched to the rear of the automobile or light truck, the driver must drive the vehicle backwards, and in doing so, he must turn his head so that he can look out the rear window of the vehicle. This is awkward. Moreover, many drivers have trouble with backing a trailer attached to the rear of the automobile or truck because in order to make the trailer travel in the direction desired, the front steering wheels of the vehicle must be moved in a direction reversed to the direction normally used to back up the automobile. The driver also tends to become dis-oriented when he twists around in order to look out the rear window of the vehicle and this adds a complicating factor to the tricky task of backing the trailer in the direction desired.

SUMMARY OF THE INVENTION

I have developed a simply easy to use trailer hitch which can be detachably fastened to the front or rear bumper of an automobile or a light truck, and can be used to haul virtually any type of trailer having a tongue weight of up to about 500 pounds.

My trailer hitch can also be used and is primarily intended to enable a boat trailer to be pivotally hitched to the front bumper of the automobile or light truck. This enables the driver to back the trailer carrying the boat into an attractive body of water by looking directly through the front windshield. This system has a number of advantages. First, the driver does not have to twist around to look through the rear windshield of the vehicle. This is much more convenient for the driver and also eliminates the tendency of the driver to become dis-oriented. Second, the driver can see the direction that is being travelled by the trailer at the same time that he can see the steering wheel. In this way, the driver quickly learns to move the steering wheel in the direction necesssary in order to make the boat trailer travel in the direction he wishes. Third, by using the front end of the automobile, or light truck, for backing the trailer in the water, the chances are very good that the rear drive wheels of the vehicle will remain on dry land. Then, when the driver wishes to pull the trailer and the boat out of the water, the rear drive wheels have considerably more traction.

The detachable trailer hitch I have invented is simple and ruggedly constructed and can be quickly and easily fastened to the front or rear bumper of a standard automobile or light truck. The hitch (which can be called a "spotting" hitch) is readily detachable because most automobile drivers do not want to have a trailer hitch permanently attached to the front of their automobile.

Normally, a driver pulling his boat by trailer will have a permanent or semi-permanent trailer hitch attached to the rear of the automobile or light truck. The boat trailer is then secured to the rear trailer hitch and pulled to the destination while riding at the rear of the vehicle. Once the destination is reached, however, the driver attaches my detachable front bumper hitch to the front bumper of the vehicle. The boat trailer is then disconnected from the rear hitch and dropped temporarily to the ground, or propped up by means of a log or some other handy article. The driver then reverses the direction of the vehicle so that the trailer can be attached to the detachable hitch mounted on the front bumper. The driver then proceeds to manoeuvre the boat trailer with the boat mounted thereon towards the water and backs the trailer and boat into the water.

My "spotting" hitch is not heavy and cumbersome like many known hitches available on the market and is ideally suited for attaching to the light, relatively weak bumpers that are used on today's automobiles and light trucks. My "spotting" hitch is constructed so that it does not place undue stress on the bumper at any single location, which could result in damage to the bumper. My hitch is also designed so that most of the load is exerted at the top of the bumper, which tends to distribute the load through the bumper supports without bending the bumper downwardly. Finally, my hitch can be located at any point on the bumper close to one of the reinforcing supports, thereby virtually eliminating any possibility of damage being done to the bumper.

My front trailer hitch can be quickly secured to the front bumper of the automobile simply by moving a lever which tightly secures the hitch to the front bumper of the automobile.

My trailer hitch comprises:
(1) a main hitch member carrying a hitch ball and having a bumper catch thereon, capable of attaching to and gripping the upper edge of the bumper of the vehicle,
(2) a pivot member pivotally connected to the main hitch member, (3) a second bumper catching means connected to the pivot member, and being capable of attaching to and gripping the lower edge of the bumper of the vehicle, (4) means connected to the main hitch member for supporting the hitch on the bumper, and (5) means connected to the main hitch member and the pivot member for tensioning the second bumper catching means against the lower edge of the bumper while the bumper catch of the main hitch member is secured to the upper edge of the bumper of the vehicle and the means connected to the main hitch member support the hitch on the bumper.

This means connected to the main hitch member for supporting the hitch on the bumper can be two adjustable bumper legs fitted into two leg nuts on the main hitch member. The two bumper legs can have feet mounted on the ends thereof constructed of a resilient material. Moreover, the two bumper legs can be threaded into the leg nuts.

The second bumper catching means can be a bumper clip adjustably attached by a flexible strap to the pivot member. The strap can be connected to the pivot member by means of a strap catch which permits the length of the strap to be adjusted.

The means for drawing the second bumper catching means against the edge of the bumper can be constructed of a hand lever, and a fork hinge, which together co-operate with the pivot member and the main hitch member to move the second bumper catching means toward or away from the edge of the automobile bumper as required. When the second bumper catching means is drawn away from the edge of the bumper to firmly secure the hitch to the bumper, the length of the strap is adjusted so that the hand lever can move to a position which provides a locking action to the hand lever, fork hinge and pivot member combination.

DRAWINGS

DETAILED DESCRIPTION OF THE INVENTION

Figure 1:
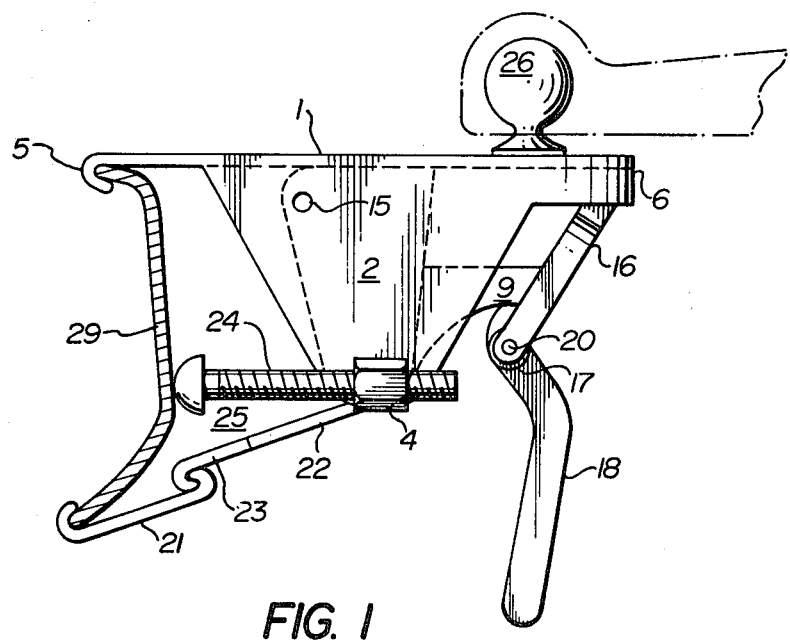
FIG. 1 represents a side view of the detachable bumper hitch attached to the front bumper of an automobile or light truck.
Figure 2:
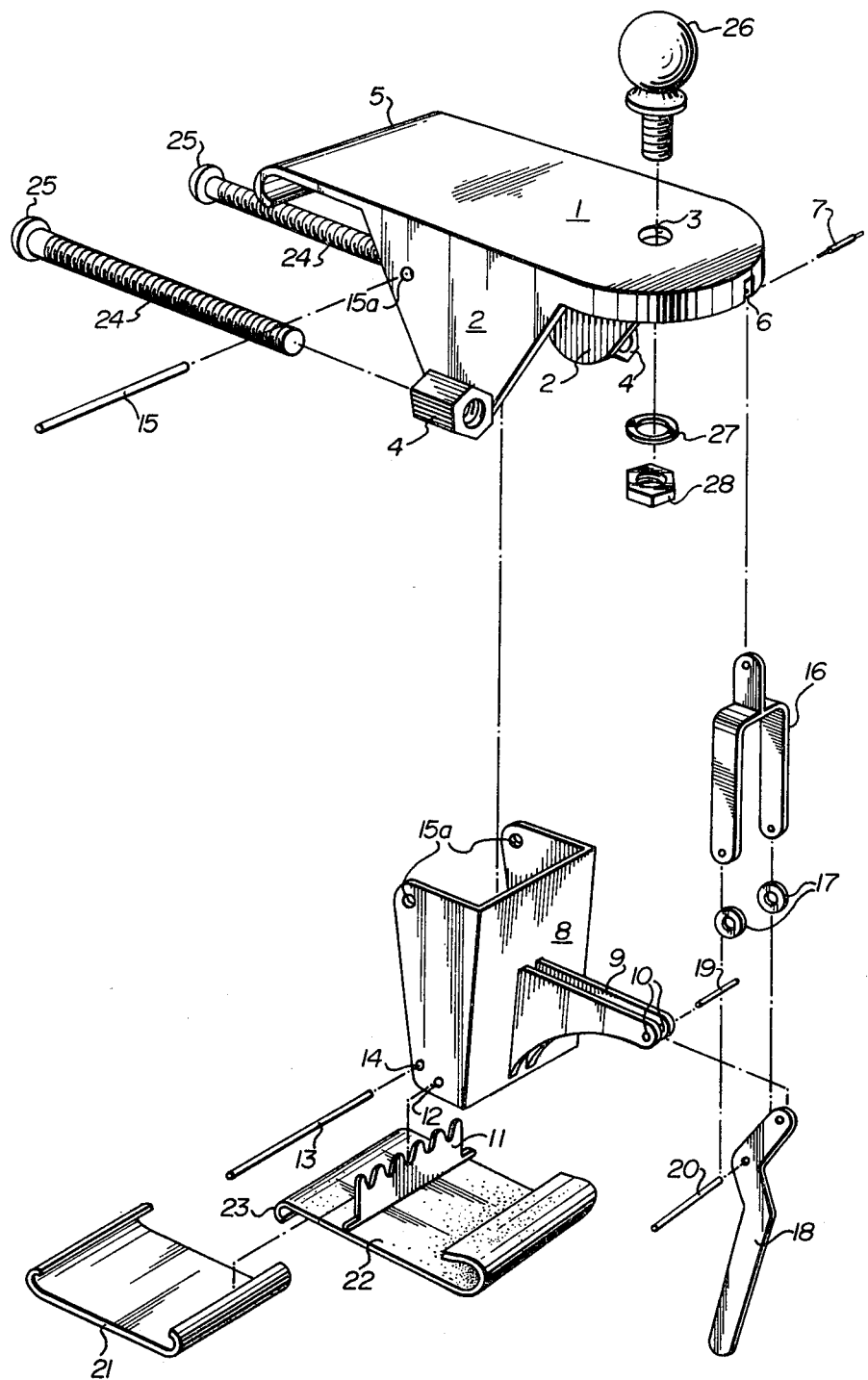
FIG. 2 represents an exploded perspective view of the various components making up the detachable bumper hitch.

Referring to FIG. 1, my detachable bumper trailer hitch consists of a three sided main hitch member 1 having a top side and two downwardly extending side wings 2 (see FIG. 2 for better view of two side wings 2). Mounted at the bottom of each of the two downwardly extending side wings 2 are two threaded leg nuts 4 having their bolt holes extending in a horizontal direction parallel to the two respective side wings 2. At the rear of the main hitch member 1 is a bumper catch 5, which is shaped to curl around and firmly grip the upper edge of the front or rear bumper of most automobiles or light trucks available on the market today.

As seen in FIG. 2, on the top side of the main hitch member 1 in the region of the hitch opposite the bumper catch 5 is located a ball hole 3. A trailer hitch ball 26 fits in ball hole 3, and is secured by a lock washer 27 and ball nut 28.

At the front of the main hitch member 1 opposite the bumper catch 5 are located hinge pivot holes 6. Hinge pivot holes 6 are two laterally extending holes which receive hinge pivot pin 7.

Positioned within the two downwardly extending side wings 2 is a three sided internal pivot member 8 which has a forward side and two rearwardly extending side pieces. Internal pivot member 8 is sized so that in outer dimension it is slightly less in width than the interior width between the two side wings 2, and thereby can move easily backward and forward within the two side wings 2. Internal pivot member 8 has extending from the forward side thereof (the right side as seen in FIGS. 1 and 2) two hinge lever pivot arms 9. Two pivot holes 10 are drilled in a lateral direction in the end areas of the two hinge lever pivot arms 9.

Three pairs of holes, namely, two strap catch pivot holes 12, two strap pin holes 14, and two internal pivot member pin holes 15a are drilled in a lateral direction and opposite one another in the two parallel sides of the internal pivot member 8.

As seen in FIG. 1, internal pivot member 8 is pivotally supported inside the two side wings 2 by means of internal pivot member pin 15 which extends between the two pin holes 15a. The two hinge lever pivot arms 9 extend in a forward direction (to the right as seen in FIG. 1).

As seen in FIG. 1, the hinge pivot pin 7 pivotally secures one end of a fork hinge 16 between hinge pivot holes 6. The pronged end of the fork hinge 16 connects to a hand lever 18 by means of two fork hinge washers 17, and a hinge lever pivot pin 20, which penetrates through two laterally extending holes in the two prongs of the fork hinge 16 and a corresponding hole in the hand lever 18, which is positioned between the two prongs. The two washers 17 are positioned on each side of the lever 18 between the two prongs of hinge 16.

One end of the hand lever 18 is positioned between the two hinge lever pivot arms 9 extending forwardly from the pivot member 8 by means of a lever pin 19 which extends laterally between the two opposite pivot holes 10 located in the ends of the two hinge lever pivot arms 9, and a corresponding hole drilled in the end of hand lever 18.

A bumper clip 21 preferably formed of steel, by means of strap catch 23 is securely connected by pressing, rivets, or some other suitable means, to a flexible strap 22. The strap 22 can be constructed of woven nylon or steel belting which provides a very strong flexible securing means link between the bottom side of pivot member 8 and the bumper of a vehicle. As seen in FIG. 1, the end of the bumper clip 21, opposite the end of the bumper clip that contacts the strap catch 23, is curved in order to fit around and firmly grip the bottom edge of the front bumper 29 of a normal automobile or light truck.

Figure 3:
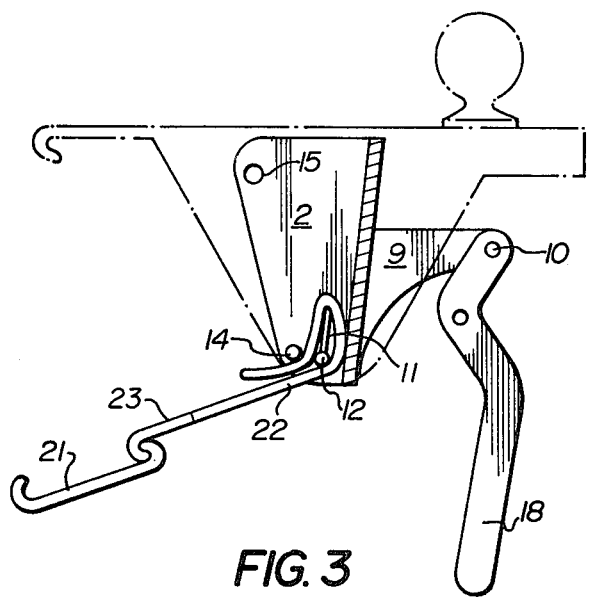
FIG. 3 represents a partial section side view of the detachable bumper hitch.

As is best seen in FIG. 3, the end of strap 22 that is not connected to the bumper clip 21 at catch is adjustably and removably connected to the bottom side of internal pivot member 8 by means of a pivotal strap catch 11. Strap catch 11, which has a series of teeth on one side thereof, in order to securely grip the strap 22 (see FIG. 2), pivotally fits within the two laterally extending strap catch pivot holes 12 which are drilled in the two side pieces of the internal pivot member 8.

The toothed strap catch 11, because it is pivotally mounted, can pinch strap 22 between its teeth and the front inside wall of internal pivot member 8. By positioning the strap catch 11 so that its teeth point in the direction of resisting movement of the strap 22, a strong secure grip can be maintained on the strap 22.

To enhance the grippability of strap catch 11 against strap 22, a second strap pin 13 is located between the two laterally extending strap pin holes 14 located in each of the two sides of internal pivot member 8. As can be seen in FIG. 3, strap 22 is fitted between strap catch 11 and the front interior wall of internal pivot member 8, is then bent around the teeth of strap catch 11, and is then threaded between the space that exists between strap catch 11 and strap pin 13. Having strap 22 bend through approximately 180° around the teeth of strap catch 11 ensures that the strap catch has a good firm grip on strap 22. However, since strap catch 11 can be pivoted away from the interior front wall of internal pivot member 8, the position of the strap 22 can be adjusted to give varying lengths of strap 22 between bumper clip 21 and strap catch 11.

As seen in FIGS. 1 and 2, two bumper legs 24 extend respectively through the two leg nuts 4 positioned on each of the two side wings 2. These two bumper legs 24 are threaded so that their position within the two leg nuts 4 can be adjusted throughout the entire length of the two bumper legs 24. Two bumper leg feet 25, constructed of a resilient material such as rubber, fit over the free ends of the two bumper legs 24. As seen in FIG. 1, these two resilient bumper leg feet 25, which bear against the front edge of the front bumper 29, ensure that the chrome finish on the bumper 29 is not scratched or marked in any way.

When a vehicle driver wishes to secure the detachable trailer hitch to the front bumper of an automobile or a light truck, he simply places bumper catch 5 around the top edge of the front bumper 29 (see FIG. 1) secures bumper clip 21 to the bottom edge of the front bumper 29, adjusts the two bumper legs 24 against the front side of the bumper 29 so that the two bumper leg feet 25 are snugly positioned against the front edge of the bumper 29, and then tightens the pull of bumper clip 21 by pressing down on hand lever 8 until it reaches its most downwardly position of travel. Handle 18 is retained in its bumper clamped position by the top face or edge (not numbered) of internal pivot member 8 engaging or resting upon the bottom face (not numbered) of main hitch member 1 upon being pivoted about pin 15 by handle 18. Immediately preceding the tightening of handle 18, the top edge of member 8 does not engage the bottom face of 1. Only upon clamping does such an engagement take place. Handle 18 is retained in its clamping position, as shown in FIG. 1, by the fork hinge 16 between 67 and 20 passing top-dead-centre of the hand lever 18 between 19 and 20. Hand lever 18 provides a mechanical advantage which enables the driver of the automobile to securely tighten strap 22, thereby ensuring that the trailer hitch 1 is firmly attached to the front bumper 29.

It is well known that the design of automobile and truck bumpers change with time, either due to fashion or changing safety factor requirements. Thus, the relative lengths and widths of the various components of the trailer hitch should be changed to accommodate the bumper design changes as required. For instance, if the upper edge of the bumper extends inwardly a substantial distance, then the length of catch 5 should be increased a greater distance than is shown in FIGS. 1, 2 and 3 so that it can grip the upper edge of the bumper. Similarly, it might be found that in some bumper designs, the length of the two bumper legs 24 should be increased so that the hitch can be drawn tightly and firmly against the bumper. These accommodating changes in the design of my trailer hitch can be made, without requiring invention.

As seen in FIG. 1, the collar of the trailer carrying the boat fits over the hitch ball 26 in a manner well known in the trailer hitching art.

Most of the components of my front bumper trailer hitch are constructed of steel, or similarly strong materials, so as to provide sufficient strength to assume the load stresses that exist between a trailer hitch collar the hitch attached to the front bumper of an automobile or light truck. To minimize corrosion, all rigid metal parts of my trailer hitch should be painted, except for the threads of the two bumper legs 24.

While the foregoing provides a detailed description of an embodiment of my trailer hitch that I have developed in order to provide a simple, rugged and easily usable bumper hitch, it will be recognised that alternative constructions can be designed without exercising inventive ingenuity. It is to be understood that such modifications represent part of my invention and fall within the scope of the claims to my invention which follow this detailed description.

What is claimed is:

1. A trailer hitch for mounting on the bumper of a vehicle comprising
   (a) a main hitch member carrying a hitch ball and having a bumper catch thereon at one end, the bumper catch being capable of attaching to and gripping the upper edge of the bumper of the vehicle;
   (b) a pivot member pivotally connected to the main hitch member;
   (c) a second bumper catching means connected to the pivot member, said bumper catching means being capable of attaching to and gripping the lower edge of the bumper of the vehicle and permitting the distance between the bumper catching means and the pivot member to be adjusted;
   (d) two adjustable length bumper legs fitted into two respective leg holders mounted on either side of the main hitch member, the two bumper legs permitting the distance between the bumper and the hitch member to be adjusted;
   (e) a hand lever pivotally engaging with the pivot member, and a fork hinge pivotally engaging with the main hitch member, the handle lever and the fork hinge being pivotally interconnected with one another whereby pivoting said hand lever about said pivoted interconnection with the fork hinge rotates said pivot member to provide a mechanical advantage and enable the second bumper catching means to be tensioned against the lower edge of the bumper while the bumper catch of the main hitch member is secured to the upper edge of the bumper of the vehicle and the two bumper legs support the hitch on the bumper.

2. A trailer hitch according to claim 1 wherein the two bumper legs have feet mounted on the ends thereof constructed of a resilient material.

3. A trailer hitch according to claim 1 or 2 wherein the bumper legs are threaded into the leg holders.

4. A trailer hitch according to claim 1 wherein the second bumper catching means is a bumper clip adjustably attached by a flexible non-stretchable strap to the pivot member.

5. A trailer hitch according to claim 4 wherein the strap is connected to the pivot member by means of a strap catch which permits the position of the strap in relation to the pivot member to be adjusted.

6. A trailer hitch according to claim 1 wherein when the second bumper catching means is drawn away from the edge of the bumper to thereby secure the hitch to the bumper, the length of the strap between the bumper clip and the pivot member is adjusted so that the hand lever can move to a position which provides a locking action to the hand lever, fork hinge and pivot member combination.

* * * * *